(12) United States Patent
Yang et al.

(10) Patent No.: US 10,691,635 B1
(45) Date of Patent: Jun. 23, 2020

(54) DATA TRANSLATION SYSTEM AND METHOD OF USE

(71) Applicants: Steve Yang, Carrollton, TX (US); Allen Hsu, Carrollton, TX (US)

(72) Inventors: Steve Yang, Carrollton, TX (US); Allen Hsu, Carrollton, TX (US)

( * ) Notice: Subject to any disclaimer, the term of this patent is extended or adjusted under 35 U.S.C. 154(b) by 170 days.

(21) Appl. No.: 15/938,764

(22) Filed: Mar. 28, 2018

Related U.S. Application Data

(60) Provisional application No. 62/478,416, filed on Mar. 29, 2017.

(51) Int. Cl.
*G06F 16/00* (2019.01)
*G06F 16/11* (2019.01)
*G06F 30/00* (2020.01)

(52) U.S. Cl.
CPC .......... *G06F 16/116* (2019.01); *G06F 30/00* (2020.01)

(58) Field of Classification Search
None
See application file for complete search history.

(56) References Cited

U.S. PATENT DOCUMENTS

| 5,717,506 A * | 2/1998 | Yamamoto | H04N 1/32358 |
| | | | 358/500 |
| 2007/0248267 A1* | 10/2007 | Bar-av | G06K 9/00161 |
| | | | 382/186 |

* cited by examiner

*Primary Examiner* — Son T Hoang
(74) *Attorney, Agent, or Firm* — Richard Eldredge

(57) ABSTRACT

A data translation system includes a server, having a database to store computer aided design (CAD) files; each of the CAD files is specified by an address having a loop number; the loop number is associated with a specified project; a first computer having a display; a secondary workstation having a second computer; and a program to convert one of the plurality of CAD files into a dynamic image, the program having a first module to generate an equation file for converting into a binary file; and a second module to generate a dynamic graphic file; activation of the program from the first computer translates a selected CAD file into the binary file and the dynamic graphic file; the binary file is downloadable to the industrial control system is readable by the second computer; and the second computer displays the dynamic graphic file as the dynamic graphic image for real-time monitoring by the secondary workstation.

6 Claims, 3 Drawing Sheets

DATA TRANSLATION SYSTEM AND METHOD OF USE

BACKGROUND

1. Field of the Invention

The present invention relates generally to data translation systems, and more specifically, to a system for translation of a computer aided design (CAD) file into an executable binary file to run in a control system and a dynamic image for display on a computer workstation.

2. Description of Related Art

Computer aided design (CAD) systems are well known in the art and are effective means to create three-dimensional computer models that can be manipulated on a computer. Commonly, CAD files are provided to secondary users, such as manufacturers, to assemble parts. Many secondary users utilize machines programmed to retrieve information, such as part features, from binary files, therefore the CAD files must generally be converted to a binary form.

One of the problems commonly associated with data translation systems, is that conversion of CAD files into a binary form can be labor intensive and prone to errors.

Accordingly, although great strides have been made in the area of data translation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
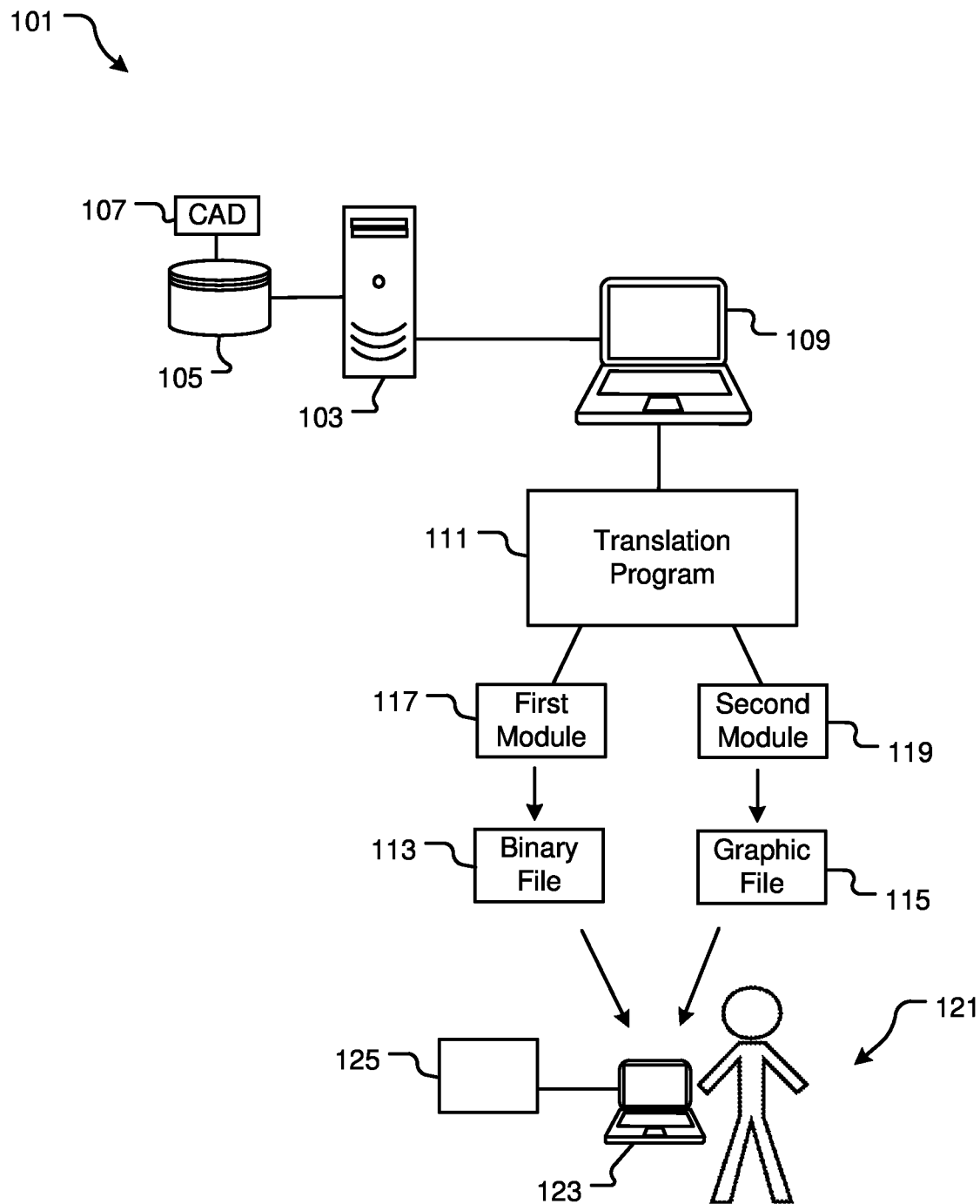
FIG. 1 is a simplified schematic of a data translation system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional data translation systems. Specifically, the present invention provides a means to automatically translate CAD files into binary files and into dynamic images. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of a data translation system 101 in accordance with a preferred embodiment of the present application. It will be appreciated that system 101 overcomes one or more of the above-listed problems commonly associated with conventional data translation systems.

In the contemplated embodiment, system 101 includes a server 103 having a database 105 with a plurality of CAD files 107 stored therein. System 101 further includes a control system 109 in communication with server 103 and configured to provide access to a translation program 111 configured to implement commands and algorithms. It should be appreciated that control system 109 is suitable for use within a plurality of industries, including power plants. Through system 109, translation program 111 is configured to convert a selected CAD file into a binary file 113 suitable for use within the specified industry and downloadable within that industry's control system, such as the power plants, and a dynamic graphic file 115 suitable for viewing dynamic images of CAD drawings within an industry control system 121. It should be appreciated system 101 provides a means to automatically translate a CAD file into a logic equation and automatically create a dynamic image of the CAD drawing for display and monitoring through the industry control system 121.

In the preferred embodiment, program 111 includes a first module 117 configured to translate the CAD file into binary file 113, and a second module 119 to translate the CAD file into dynamic graphic file 115. System 101 further includes an industry control system 121, wherein a secondary computer 123 is configured to read binary file 113 as well as display graphic file 113 as a dynamic image 125. It should be understood that program 111 provides for automatic translation of the selected CAD file, thereby allowing for real-time monitoring of graphic image 125 through the industry control system 121.

It should be appreciated that one of the unique features believed characteristic of the present application is the automatic translation of a CAD file into both a binary file and a dynamic graphic file. It should be appreciated that the automation provides a means to greatly reduce the ability for error, as well as for a means to drastically reduce the effort required in conventional data translation systems. The dynamic graphic file provides a means to monitor a dynamic image of a CAD drawing with the industry control system 121. Further, it should be appreciated that the binary file created with system 101 can be implemented in an industry, wherein the binary file can provide information relevant for controlling equipment from a computer. In addition, the graphic file created provides a means to display dynamic information of process parameters associated with the industry's control system and further provides a means of display status measures of various components associated with the control system.

Figure 2:
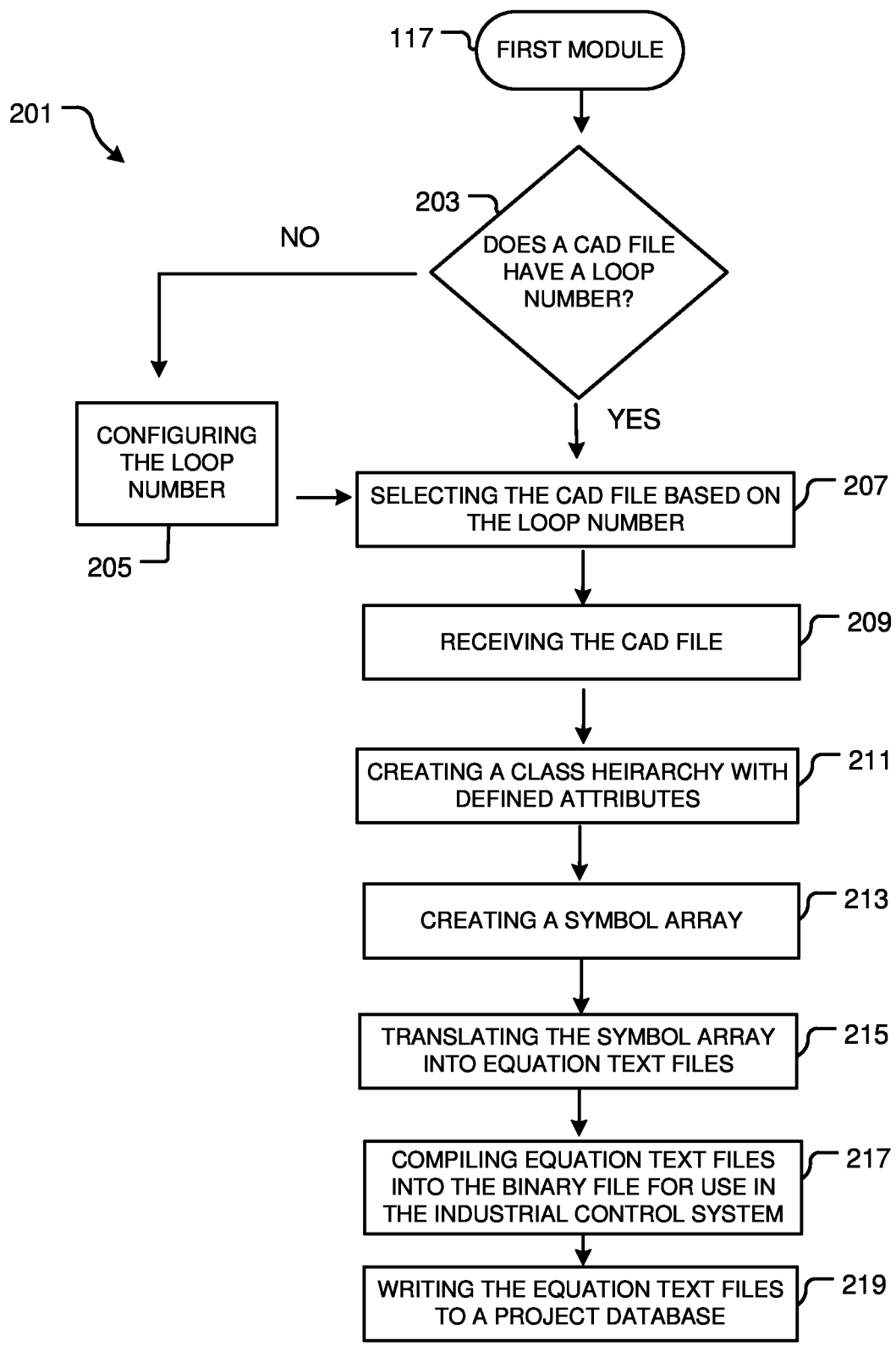
FIG. 2 is a flowchart of the process of a first module from FIG. 1.

In FIG. 2, a flowchart 201 depicts the process of first module 117. The CAD files stored within database 107 are assigned a loop number associated with a specified project and selected based on the loop numbers, as shown with boxes 203, 205, 207. It should be appreciated that module 117 provides a means to configure the loop number if one is not already available with the needed CAD file. One or more CAD files are received by program 111, and attributes associated with the CAD files are defined based on a class hierarchy associated with the specified project, as shown with boxes 209, 211.

In the preferred embodiment, the class hierarchy includes a project class that represents attributes of the specified project; an installation class that represents attributes of the loop number; a page class that represents attributes of a drawing within the CAD file; and a symbol class that represents a symbol within the drawing. Each symbol can represent a line, a point identifier, or a shape.

The defined attributes are translated into a symbol array to be further converted into one or more equation text files, as shown with boxes 213, 215. The equation text files are then compiled into one or more binary files and saved to a project database, as shown with boxes 217, 219. The binary files created can then be used in a control system 121 for industrial applications.

Figure 3:
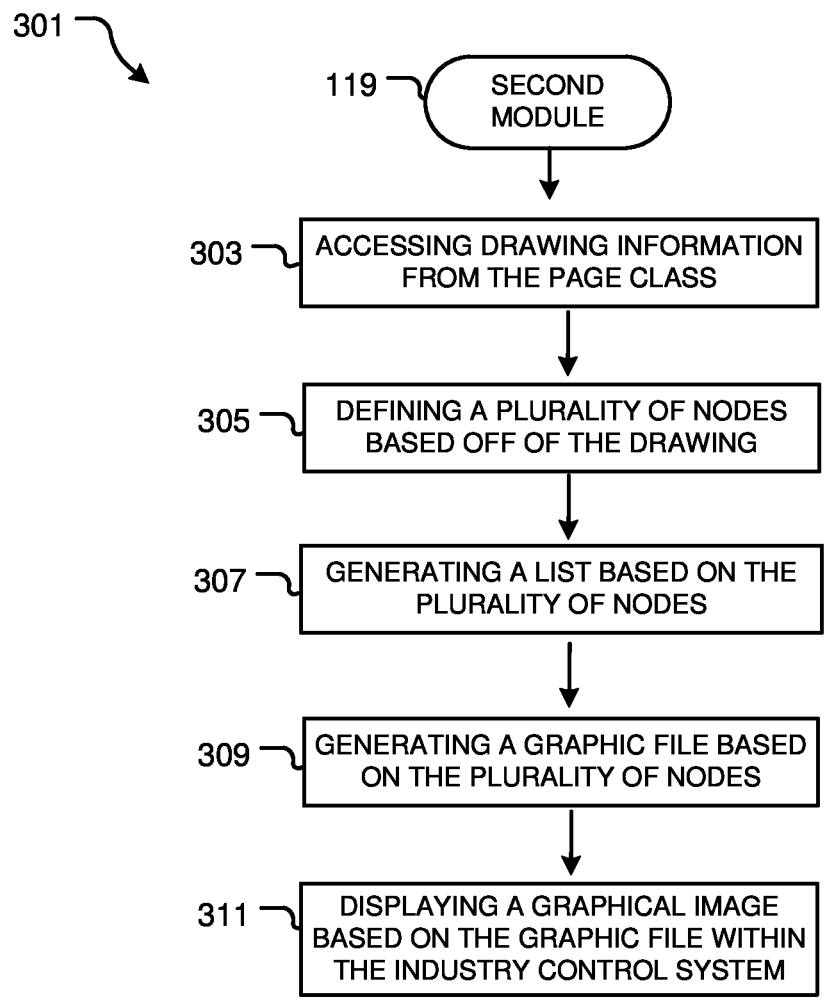
FIG. 3 is a flowchart of the process of a second module from FIG. 1.

In FIG. 3, a flowchart 301 depicts the process of second module 119. Drawing attributes of the CAD file are obtained through the page class of the hierarchy system, as shown with box 303. The drawing attributes are utilized to define a plurality of nodes, wherein a list of the plurality of nodes is generated, as shown with boxes 305, 307. The list of nodes is then used to generate a dynamic graphic file, readable by the secondary computer, as shown with box 309. A dynamic graphical image can then be displayed on the secondary computer for real-time monitoring by industry control system 121, as shown with box 311.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A data translation system, comprising:
   a server, having:
      a database configured to store a plurality of computer aided design (CAD) files;
   wherein each of the plurality of CAD files is specified by an address having a loop number,
   and the loop number is used to identify a specified project associated with the CAD file, the specified project being stored in a project database different from the database;
   a first computer;
   a second computer having a display and being associated with a workstation; and
   a program configured to convert one of the plurality of CAD files into a dynamic image, the program having:
      a first module configured to generate an equation file for converting a selected CAD file into a non-graphic binary file; and
      a second module configured to generate a graphic file directly from the selected CAD file;
   wherein activation of the program from the first computer translates the selected CAD file into the dynamic image comprising both the binary file and the graphic file,
   the second computer is configured to display the dynamic graphic image on the display for real-time monitoring of the specified project by the workstation, and
   the monitoring is based at least on the binary file.

2. A method for translating a computer aided design (CAD) file into the binary file and the graphic file, the method comprising:
   providing the system of claim 1;
   selecting one or more of the plurality of CAD files based on the loop number;
   receiving one or more of the plurality of CAD files from the database;
   creating a class hierarchy with defined attributes from the plurality of CAD files;
   creating a symbol array from the defined attributes of the class hierarchy; translating the symbol array into one or more equation text files:
   compiling the one or more equation text files into an executable code in the binary file; and
   writing the equation text files to the project database.

3. The method of claim 2, further comprising:
   configuring the loop number to be associated with one of the plurality of CAD files.

4. The method of claim 2, wherein the class hierarchy comprises:
   a project class that represents the specified project;
   an installation class that represents the loop number; a page class that represents drawing attributes; and
   a symbol class that represents a symbol defined as a connecting line, a point identifier, or a symbol type.

5. The method of claim 4, further comprising:
   defining a plurality of nodes based on the drawing attributes; and
   generating a list of the plurality of nodes;
   each of the plurality of nodes has a specified attribute, and the specified attribute represents a static or dynamic geometric property.

6. The method of claim 5, further comprising:
   generating the graphic file based on the plurality of nodes.

* * * * *